(12) United States Patent
Matsumoto et al.

(10) Patent No.: US 11,046,831 B2
(45) Date of Patent: Jun. 29, 2021

(54) SOUND-INSULATING SPONGE MATERIAL, VEHICLE SEALING MATERIAL, AND WEATHER STRIP

(71) Applicants: Nishikawa Rubber Co., Ltd., Hiroshima (JP); DAIO PAPER CORPORATION, Ehime (JP)

(72) Inventors: Keigo Matsumoto, Hiroshima (JP); Syoichi Nakamoto, Hiroshima (JP); Katsunori Nakashima, Hiroshima (JP); Junya Okawa, Ehime (JP); Takaaki Imai, Ehime (JP)

(73) Assignees: Nishikawa Rubber Co., Ltd., Hiroshima (JP); DAIO PAPER CORPORATION, Ehime (JP)

( * ) Notice: Subject to any disclaimer, the term of this patent is extended or adjusted under 35 U.S.C. 154(b) by 0 days.

(21) Appl. No.: 16/198,273

(22) Filed: Nov. 21, 2018

(65) Prior Publication Data
US 2019/0161592 A1 May 30, 2019

(30) Foreign Application Priority Data
Nov. 30, 2017 (JP) .............................. JP2017-231043

(51) Int. Cl.
*C08J 9/36* (2006.01)
*G10K 11/162* (2006.01)
*C08K 7/02* (2006.01)

(52) U.S. Cl.
CPC ............ *C08J 9/365* (2013.01); *G10K 11/162* (2013.01); *C08J 2323/16* (2013.01); *C08J 2401/02* (2013.01); *C08J 2483/04* (2013.01); *C08K 7/02* (2013.01); *Y10T 428/249987* (2015.04); *Y10T 428/249992* (2015.04)

(58) Field of Classification Search
CPC .... C08J 9/365; C08J 2483/04; C08J 2323/16; C08J 2401/02; C08J 2475/04; B60R 13/06; B60R 13/08; B60R 13/0815
See application file for complete search history.

(56) References Cited

U.S. PATENT DOCUMENTS

| | | | | |
|---|---|---|---|---|
| 5,700,845 A | * | 12/1997 | Chung | .................. C08J 9/0066 521/99 |
| 6,742,784 B2 | * | 6/2004 | Sakane | .................. F16J 15/025 277/628 |
| 2003/0088017 A1 | | 5/2003 | Sato | |
| 2007/0134502 A1 | | 6/2007 | Fonda | |

FOREIGN PATENT DOCUMENTS

| | | |
|---|---|---|
| JP | S56-159158 A | 12/1981 |
| JP | 2002-268648 A | 9/2002 |
| JP | 2004204380 A * | 7/2004 |

(Continued)

OTHER PUBLICATIONS

Translation of JP 2004-204380, Yamane et al., Jul. 22, 2004. (Year: 2004).*

(Continued)

*Primary Examiner* — Hai Vo
(74) *Attorney, Agent, or Firm* — Renner, Otto, Boisselle & Sklar LLP (57) ABSTRACT

A surface of a rubber sponge material 4 such as a vehicle weather strip is covered with a resin coat 6 containing dispersed cellulose fibers 5.

9 Claims, 4 Drawing Sheets

(56) References Cited

FOREIGN PATENT DOCUMENTS

| | | | |
|---|---|---|---|
| JP | 3727010 B | | 10/2005 |
| JP | 2009-520082 A | | 5/2009 |
| JP | 2011-207938 A | | 10/2011 |
| JP | 2014-111731 A | | 6/2014 |
| JP | 2015168285 A | * | 9/2015 |
| JP | 2016056460 A | * | 4/2016 |
| JP | 2016-188353 A | | 11/2016 |
| WO | 2017/006993 A1 | | 1/2017 |

OTHER PUBLICATIONS

Translation of JP 2016056460, Okawa Junya, Apr. 21, 2016. (Year: 2016).*

Translation of JP 2015168285, Takahashi Makoto, Sep. 8, 2015. (Year: 2015).*

Gardner et al., "Adhesion and Surface Issues in Cellulose and Nanocellulose," Journal of Adhesion Science and Technology 22 2008 545-567. (Year: 2008).*

* cited by examiner

A: GLASS ABRASION ELEMENT FOR ABRASION RESISTANCE TEST (t = 3.5 mm)
B: EVALUATION COATING SAMPLE

SOUND-INSULATING SPONGE MATERIAL, VEHICLE SEALING MATERIAL, AND WEATHER STRIP

CROSS-REFERENCE TO RELATED APPLICATION

This application claims priority to Japanese Patent Application No. 2017-231043 filed on Nov. 30, 2017, the disclosure of which including the specifications, the drawings, and the claims is hereby incorporated by reference in its entirety.

BACKGROUND

The present disclosure relates to a sound-insulating sponge material, a vehicle sealing material, and a weather strip.

Coating on a surface of a base material has been widely employed in order to provide functions to the base material and enhance appearance of the base material. The surface of a weather strip for a vehicle, for example, is coated with a curable urethane-based coating material or the like in order to provide functions such as abrasion resistance and slipperiness (slidability) and enhance appearance of the vehicle. Japanese Patent No. 3727010, for example, describes that a weather strip is coated with a urethane-based aqueous coating material, and after drying and curing of the coating material, the weather strip is then coated with a silicone compound containing amino groups.

On the other hand, it has been generally performed to spray a fiber material to a surface of a base material in order to increase a sound-insulating property of the base material. Japanese Patent Publication No. 2002-268648, for example, describes that a sound-absorbing material mainly containing natural fibers and a synthetic resin is sprayed to a vehicle body panel to obtain a vehicle sound-absorbing structure, cellulose-based fibers having an average fiber length of 0.5 to 4.0 mm are used as the natural fibers, a liquid adhesive in a range from 1 to 30% by weight is mixed as the synthetic resin, and a basis weight is 0.2 to 3 kg/m$^2$. Japanese Patent Publication No. 2011-207938 and Japanese Patent Publication No. 2016-188353 describe that a polyurethane resin containing crystalline cellulose is used as a sound-shielding material.

In general, many types of machines are required of being lightweight. For example, each part of vehicles, for example, has required of being lightweight in order to increase fuel efficiency. In the weather strip mentioned above, the weight has been reduced by reducing the specific gravity of a rubber material. However, the resulting weather strip easily passes sound therethrough, causing the problem of degradation of a sound-insulating property. On the other hand, various measures have been made by increasing the thickness of the weather strip, increasing a sealing area, and/or additionally providing a sound-insulating lip or a lip in a hollow portion. These measures, however, increase difficulty in design of cross section of the weather strip and manufacturing, resulting in an increase in manufacturing costs.

SUMMARY

It is therefore an object of the present disclosure to enhance a sound-insulating property of a rubber sponge material such as a weather strip.

To achieve the object, the present disclosure may use cellulose fibers for increasing a sound-insulating property of the rubber sponge material.

That is, a sound-insulating sponge material disclosed here has a feature in which a surface of the rubber sponge material is coated with a resin coat containing dispersed cellulose fibers.

With this feature, since the cellulose fibers are dispersed in the resin coat on the surface of the rubber sponge material, an enhanced sound-insulating property can be obtained. Reasons for this phenomenon are not clear, but can be assumed that an increased internal loss of the resin coat due to a mixture of the resin and the cellulose fibers enhances the sound-insulating property together with an internal loss of the rubber sponge member. The dispersion of the cellulose fibers in the resin coat can increase abrasion resistance and slipperiness of the sponge material, and reduce squeaking noise caused by rubbing of the sponge material against another object such as a vehicle body or a windowpane and, furthermore, prevent damage of the object. The surface of a dried and cured resin coating layer has minute unevenness derived from cellulose fibers, but a sealing function as a weather strip (e.g., water-cutoff property at contact with a vehicle body and other objects) does not degrade and is maintained.

In one embodiment of the sound-insulating sponge material, the rubber sponge material may have a specific gravity of 0.7 or less.

In general, as the specific gravity of a sound-insulating material or a sound-absorbing material decreases, a sound-insulating property decreases by the mass low. Experimental data represented below, however, shows that, although the sound-insulating property decreases as the specific gravity decreases, the presence of a resin coat containing dispersed cellulose fibers can suppress the degradation of the sound-insulating property with the decrease in specific gravity. That is, the presence of such a resin coat is advantageous in achieving mutually contradictory requirements of weight reduction and enhancement of the sound-insulating property.

In one embodiment of the sound-insulating sponge material, the rubber sponge material may be an EPDM.

In one embodiment of the sound-insulating sponge material, a content of the cellulose fibers in the resin coat may be greater than or equal to 0.2% by mass and less than or equal to 50% by mass. The lower limit of this content is preferably 1% by mass and more preferably 5% by mass. On the other hand, the upper limit of the content is preferably 30% by mass.

When the content of cellulose fibers decreases, the effect of enhancing the sound-insulating property, abrasion resistance, and slipperiness due to dispersion of cellulose fibers in the resin coat is weakened. In view of this, the content is preferably greater than or equal to the lower limit described above. On the other hand, when the content of cellulose fibers increases, the viscosity of the coating increases in application, and a coating property degrades. In view of this, the content is preferably less than or equal to the upper limit described above.

In one embodiment of the sound-insulating sponge material, the cellulose fibers may have a specific surface area greater than or equal to 5 m$^2$/g and less than or equal to 600 m$^2$/g. This range is advantageous in enhancing a sound-insulating property.

In one embodiment of the sound-insulating sponge material, a resin component of the resin coat may be a urethane resin or a silicone resin.

The sound-insulating sponge material is useful as a vehicle sealing material and can be used as the whole or a part of, for example, a door weather strip, a glass run channel, or a sealing material for closing a service hole for attachment of a door part of a door panel.

DESCRIPTION

An embodiment for carrying out the present disclosure will be described with reference to the drawings. The following embodiment is merely a preferred example in nature, and is not intended to limit the invention, applications, and use of the applications.

Sound-Insulating Sponge Material

Figure 1:
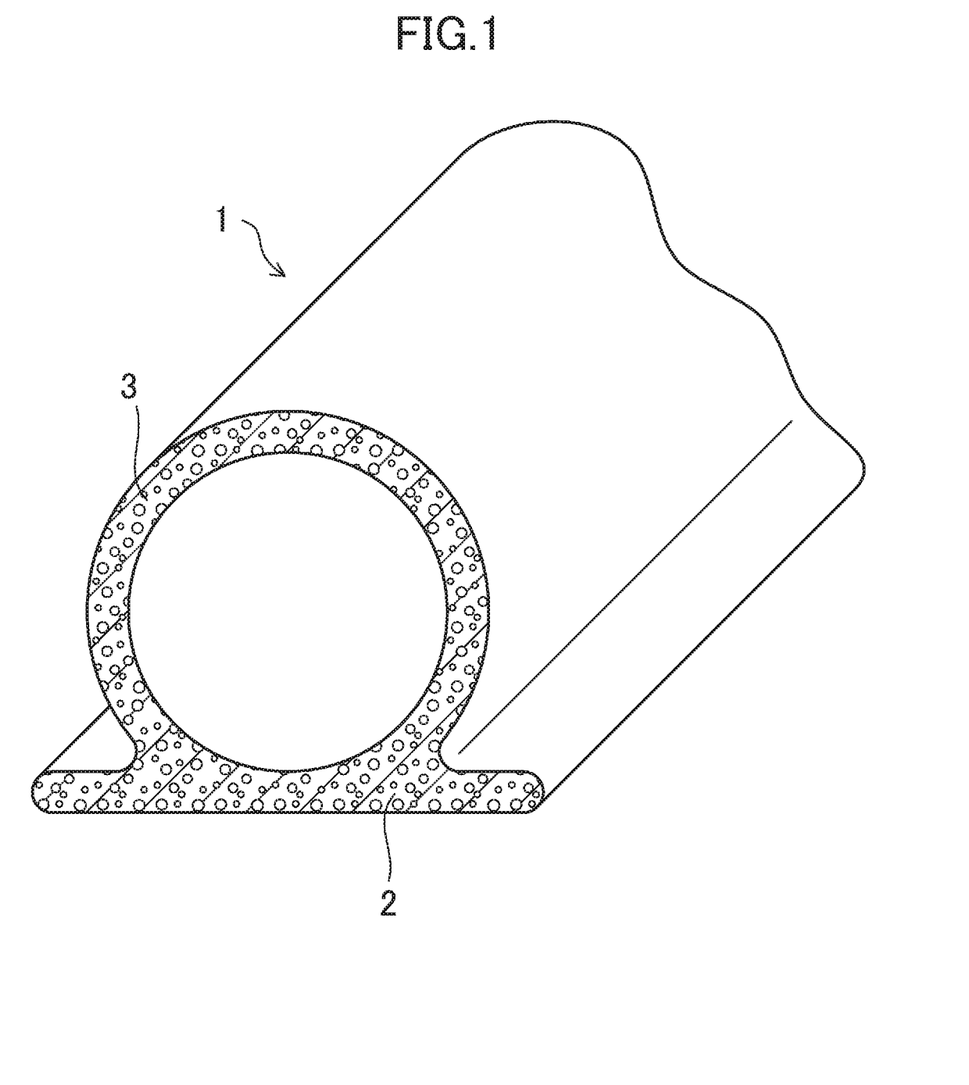
FIG. 1 is a perspective view with a partial cross section illustrating a weather strip according to an embodiment.
Figure 2:
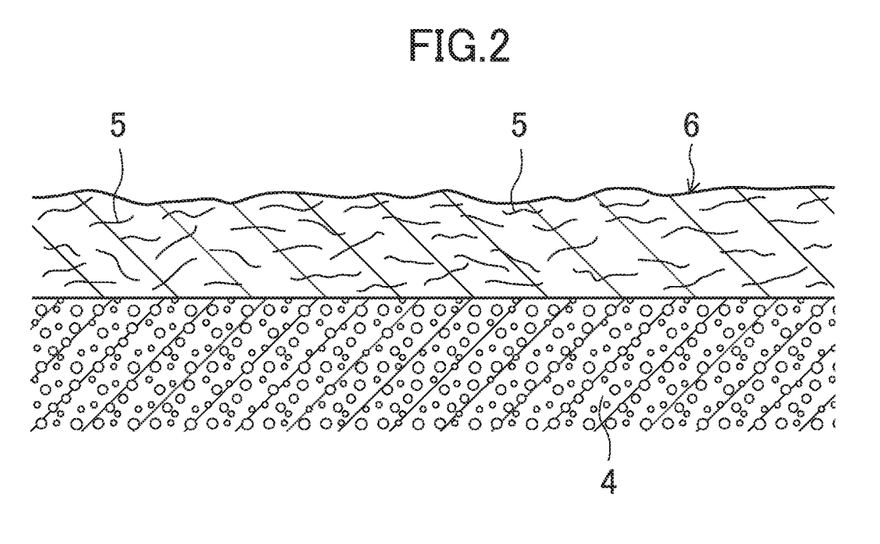
FIG. 2 is a cross-sectional view illustrating a part of a weather strip according to the embodiment.

In a vehicle door weather strip 1 as a sound-insulating sponge material generally illustrated in FIG. 1, reference numeral 2 denotes an attachment base that is attached to a peripheral portion of a door, and reference numeral 3 denotes a hollow sealing portion integrated with the attachment base 2. As illustrated in FIG. 2, in the hollow sealing portion 3, a surface of a rubber sponge material 4 is covered with a resin coat 6 containing dispersed cellulose fibers 5.

As a rubber material for the rubber sponge material 4, ethylene-propylene-diene rubber (EPDM) is preferably used. Other rubber materials or other elastic materials having rubber-like elasticity, such as isoprene rubber (IR), chloroprene rubber (CR), thermoplastic elastomer (olefin-based or styrene-based thermoplastic elastomer), or soft polyvinyl chloride. The weather strip 1 may be partially made of a solid material.

The rubber sponge material 4 covered with the resin coat 6 preferably has a specific gravity less than or equal to 0.7.

A resin component (coating element) of the resin coat 6 is preferably an urethane resin or silicone resin. The urethane resin and the silicone resin may be used together. Other resins such as an acrylic resin, a vinyl chloride, and an epoxy resin may be used.

From the viewpoint of obtaining interfacial adhesion by chemical bonding between a resin as a coating element and the cellulose fibers 5, the resin coat 6 can contain a coupling agent such as carbodiimide, isocyanate, or a silane coupling agent.

The cellulose fibers 5 are fibers obtained from a plant material such as a pulp. As the pulp for the cellulose fibers, a chemical pulp, a mechanical pulp, or a waste paper pulp may be employed.

Examples of the chemical pulp include broad-leaved tree kraft pulps (LKP) such as a broad-leaved tree bleached kraft pulp (LBKP) and a broad-leaved tree unbleached kraft pulp (LUKP) and needle-leaved tree kraft pulps (NKP) such as a needle-leaved tree unbleached kraft pulp (NBKP) and a needle-leaved tree unbleached kraft pulp (NUKP).

Examples of the mechanical pulp include a stone groundwood pulp (SGP), a pressurized stone groundwood pulp (PGW), a refiner groundwood pulp (RGP), a chemical groundwood pulp (CGP), a thermo-groundwood pulp (TGP), a groundwood pulp (GP), a thermo-mechanical pulp (TMP), a chemi-thermo-mechanical pulp (CTMP), and a bleached thermo-mechanical pulp (BTMP).

The waste paper pulp is made from a waste brown paper, waste craft envelope paper, waste magazine paper, waste newspaper, waste flyer paper, waste office paper, waste corrugated cardboard paper, waste white paper, waste Kent paper, waste simili paper, waste cardboard paper, waste groundwood paper, and so forth. A deinking pulp (DIP) obtained by performing deinking on a waste pulp may also be employed.

One type of the pulps may be used alone or some types of the pulps may be used in combination.

Examples of other plant materials include a linter pulp and pulps obtained from hemp, bagasse, kenaf, esparto, bamboo, hull, straw, and so forth. Wood, hemp, bagasse, kenaf, esparto, bamboo, hull, straw, and so forth as materials for pulps may be directly used as plant materials.

Cellulose fibers for aqueous coating material according to this embodiment have a mode at 5 μm or more in a pseudo particle size distribution curve based on the volume measured by laser diffraction. The "pseudo particle size distribution curve" refers to a curve obtained by using a particle size distribution analyzer "LA-960S" manufactured by HORIBA, Ltd. as a particle size distribution analyzer, and indicating a volume-based particle size distribution measured for a dispersion solution dispersed in water as a dispersion medium and subjected to an ultrasonic process.

The cellulose fibers 5 preferably have a fiber diameter from nano-size (greater than or equal to 1 nm and less than or equal to 1000 nm) to about 20 μm or less. The cellulose fibers 5 preferably have a fiber length greater than or equal to 1 μm and less than or equal to 100 μm. The cellulose fibers 5 preferably have a specific surface area greater than or equal to 5 $m^2/g$ and less than or equal to 600 $m^2/g$.

Such cellulose fibers can be obtained by fibrillating a plant material (fiber material) with a known method. As a fabrication method in the case of using a pulp as a plant material, a water-dispersion pulp may be fibrillated by a mechanical treatment, or may be fibrillated by a chemical treatment such as an enzyme treatment or an acid treatment. Examples of the fibrillating method by a mechanical treatment include a grinder method that grinds a pulp between rotating grindstones, a counter collision method using a high-pressure homogenizer, and a pulverizing method using a high-speed disk refiner, a vibration mill, a homomixer under high-speed rotation, a shearing mixer, a planetary rolling mixer, an ultrasonic disperser, a bead mill, a rod mill, a ring mill, an attriton mill, a ball mill, a roll mill, and a cutter mill. In general, fibrillation is repeatedly performed until cellulose fibers obtained by fibrillating a pulp becomes a desired size. In a case of a plant material except pulps, cellulose fibers can be obtained in a similar manner.

The content of the cellulose fibers 5 in the resin coat 6 is preferably greater than or equal to 0.2% by mass and less than or equal to 50% by mass. In the resin coat 6, hemicellulose and/or lignin derived from plants for a material of the cellulose fibers 5, for example, may remain.

Method for Producing Sound-Insulating Sponge Material

The sound-insulating sponge material can be obtained by coating a surface of the rubber sponge material 4 with the resin coat 6. As the coating method, the following coating method may be employed.

Coating Method

The method includes a first process of preparing a cellulose fiber-containing coating material by mixing a cellulose dispersion solution in which the cellulose fibers 5 are dispersed in water with a aqueous coating material, a second process of applying the cellulose fiber-containing coating material to a surface of the rubber sponge material 4, and a third process of drying and curing the coat obtained by the second process. The cellulose fiber-containing coating material may be applied with a coating gun (spray gun) or a blade, for example.

This coating method can obtain the resin coat 6 in which the cellulose fibers 5 are uniformly dispersed in the entire resin coat 6.

Others

In the coating method, in order to increase the thickness of the resin coat 6 after the third process (drying and curing), or in order to overcoat an already-coated portion in a case where an uncoated portion needs to be coated after the third process (drying and curing) and another subsequent process, overcoating of performing coating again may be performed. Since the primarily dried and cured surface of the resin coating layer has minute unevenness derived from the cellulose fibers 5, binding power between layers is increased. Thus, even with such overcoating performed after drying and curing, separation between coating layers can be suppressed, and the layers are not peeled off.

EXAMPLE AND COMPARATIVE EXAMPLE

Example

Example is a case where a cellulose fiber-containing resin coat is formed on a surface of a rubber sponge material by the coating method described above.

A cellulose fiber-containing coating material having a composition shown in Table 1 and a 2 mm-thick EPDM rubber sponge plate (specific gravity: 0.48) formed by extrusion and vulcanization were prepared. This cellulose fiber-containing coating material was obtained by mixing a cellulose dispersion solution and a aqueous coating material.

The cellulose dispersion solution was obtained by diluting a 2% cellulose fiber slurry (240 parts by weight) made from a broad-leaved tree bleached kraft pulp in Table 1 with ion-exchanged water (300 parts by weight), and the concentration of cellulose fibers was 0.9% by mass. The dilution used a planetary centrifugal mixer. The cellulose fibers had a fiber diameter of several tens of nanometers, and had a fiber length of 1 to 100 μm.

TABLE 1

| Component | Content (parts by weight) |
| --- | --- |
| curable silicone resin | 100 |
| silane coupling agent | 3 |
| 2% cellulose fiber slurry | 240 |
| ion-exchanged water | 300 |

A surface of the rubber sponge plate was degreased with a thinner, and then, the cellulose fiber-containing coating material having the composition shown in Table 1 was applied to the rubber sponge plate with a coating gun. Thereafter, the rubber sponge plate was held in an oven at 90° C. for 10 minutes, thereby drying and curing the coat.

A resin coat of the sound-insulating sponge material obtained in the foregoing manner had a dry thickness of 6 to 9 μm, and the content of cellulose fibers was about 10% by mass.

Comparative Example

A rubber sponge plate identical to that used in Example was prepared, a surface of the rubber sponge plate was degreased with a thinner, and then a aqueous coating material having a composition shown in Table 2 was applied by a coating gun. Thereafter, the rubber sponge plate was held in an oven at 90° C. for 10 minutes so that the coat was dried and cured, thereby forming a resin coat including no cellulose.

TABLE 2

| Components | Content (parts by weight) |
| --- | --- |
| curable silicone resin | 100 |
| silane coupling agent | 3 |
| ion-exchanged water | 50 |

Physical Property Evaluation

Properties of sound-insulating sponge materials (evaluation coating samples) of Example and Comparative Example were examined. The results are shown in Table 3.

Figure 3:
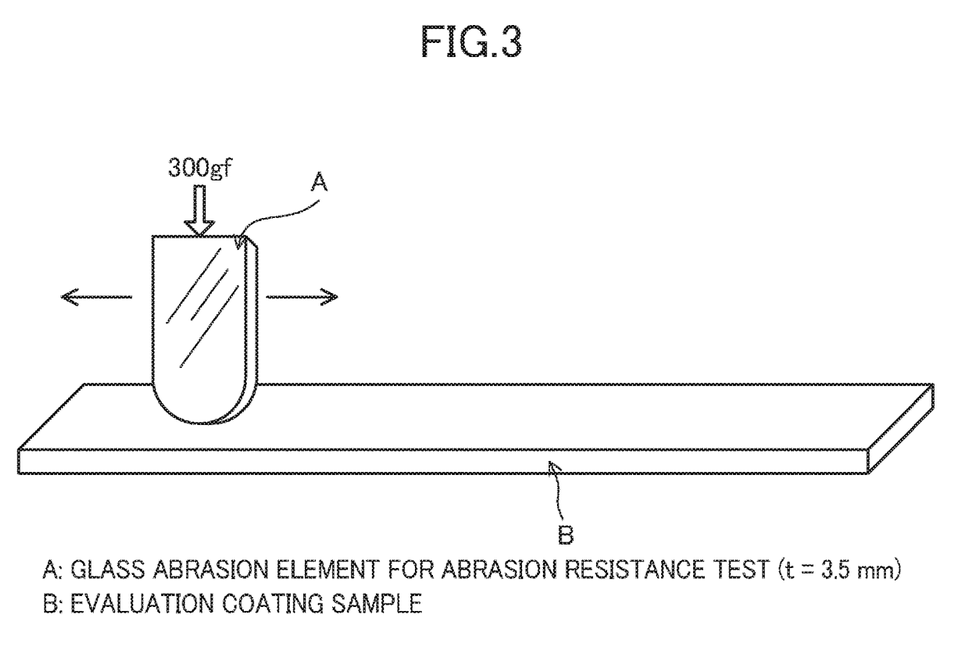
FIG. 3 is a perspective view generally illustrating an abrasion resistance test.

A test for abrasion resistance in Table 3 was conducted in the manner illustrated in FIG. 3 using a Gakushin-type rubbing tester (stroke: 150 mm, speed: 60 times/min.) including a glass abrasion element for an abrasion resistance test (thickness=3.5 mm), and the number of strokes when the base material was exposed due to abrasion or detachment of the coated surface of each evaluation coating sample was obtained. As the number of strokes increases, abrasion resistance of the coat increases.

The coefficient of static friction and the coefficient of dynamic friction in Table 3 were obtained in the following procedure. The sample was slid twice at a sliding speed of 1000 mm/min using a Heidon tester (HEIDON TRIBO-GEAR TYPE32, measurement element: watch glass, load: 20 N), and then was slid again at the third time. The value at the third time was obtained as a measured value. As the coefficients of friction decrease, slipperiness of the coat increases.

TABLE 3

| Evaluation Items | Example cellulose fiber-containing coating material | Comparative Example cellulose fiber-noncontaining coating material |
|---|---|---|
| abrasion resistance | 6800 | 4500 |
| coefficient of static friction | 0.80 | 3.31 |
| coefficient of dynamic friction | 0.09 | 0.77 |

Example in which cellulose fibers are dispersed in a resin coat shows an abrasion resistance 1.5 times as high as that of Comparative Example not including cellulose fibers. The coefficients of friction in Example are smaller than those in Comparative Example, indicating that slipperiness is higher in Example than in Comparative Example.

The surface roughness is larger in Example than in Comparative Example, and the large surface roughness is a factor of such high abrasion resistance and slipperiness.

Sound-Insulating Property Evaluation

Comparison Between Example and Comparative Example

Figure 4:
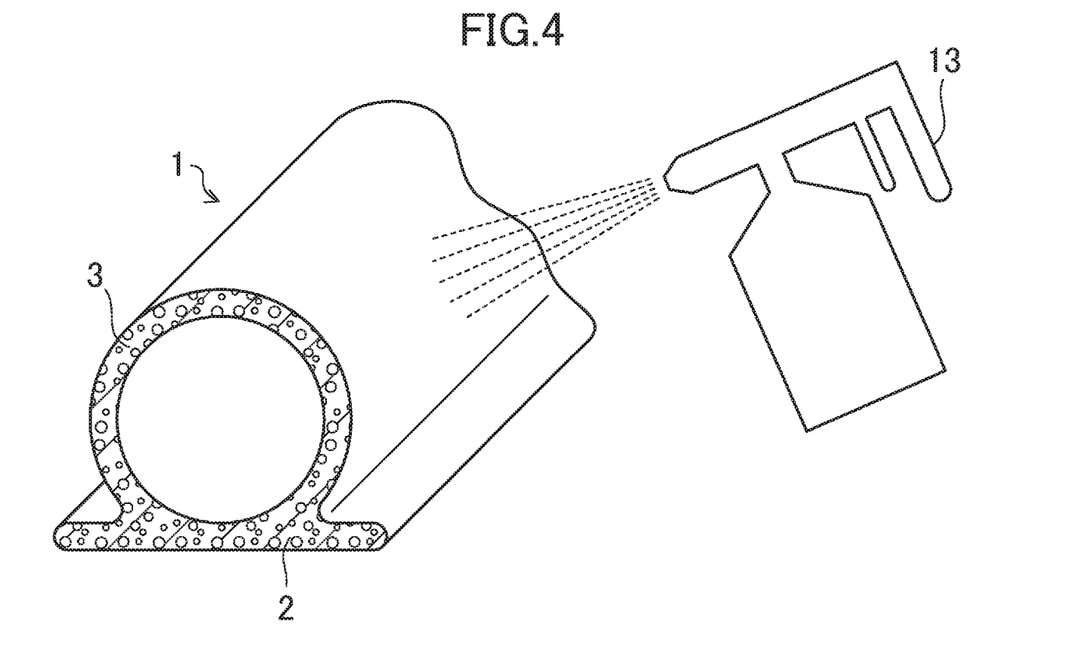
FIG. 4 is a perspective view with a partial cross section for describing a method for producing a transmitted sound measuring test sample.

Samples in each of which a surface of the hollow sealing portion 3 of the weather strip 1 was provided with coating were prepared as illustrated in FIG. 4 with various conditions and methods of Example and Comparative Example to evaluate a sound-insulating property. The weather strip 1 is an extruded sponge material (specific gravity: 0.48) with a thickness of 2 mm.

Figure 5:
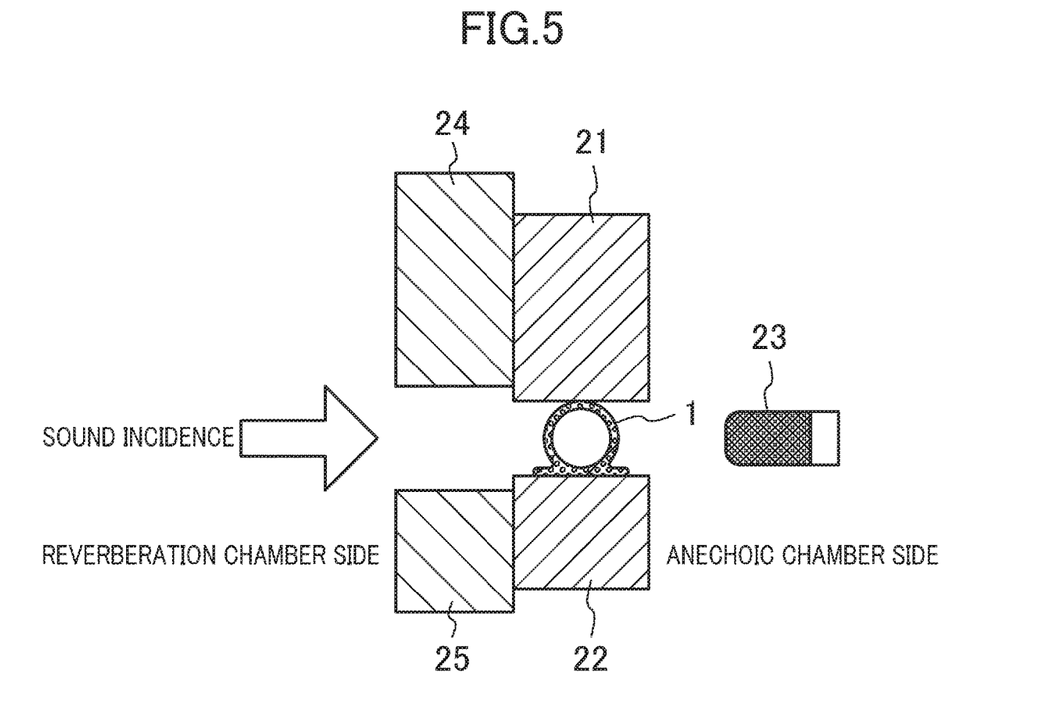
FIG. 5 is a cross-sectional view generally illustrating a transmitted sound measuring test facility.

FIG. 5 illustrates a sound-insulating property test facility. The weather strip 1 was sandwiched between upper and lower jigs 21 and 22 and compressed to have its total height decrease by 34%, a sound source was placed in a reverberation chamber (with 90 dB uniformly in the reverberation chamber), and a nondirectional microphone 23 was placed in an anechoic chamber to measure transmitted sound. Insulating plates 24 and 25 were provided at the sides of the jigs 21 and 22 toward the reverberation chamber. The measurement frequency was 100 Hz to 10000 Hz.

The transmitted sound was measured to show that the sound pressure was lower by about 2 dB in Example than in Comparative Example in the frequency range from 1000 Hz to 4000 Hz.

Figure 6:
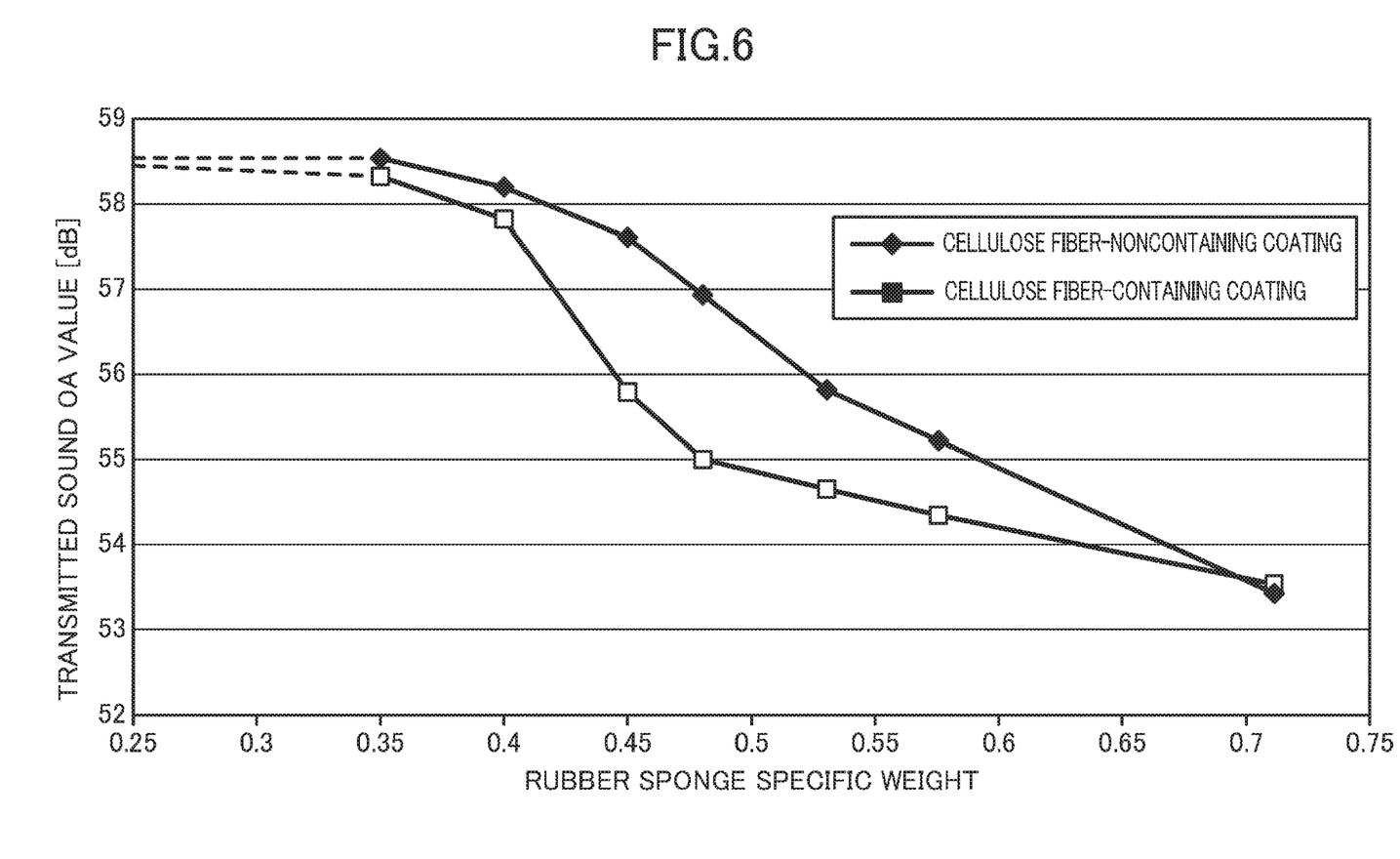
FIG. 6 is a graph showing a relationship between a specific gravity of a rubber sponge material and transmitted sound.

Relationship Between Specific Gravity of Rubber Sponge Material and Sound Insulation Property Weather strips (2 mm-thick EPDM extruded vulcanized sponge materials) having specific gravities of 0.36, 0.41, 0.45, 0.48, 0.53, 0.57, and 0.70 were prepared. Resin coats were formed on these weather strips having different specific gravities with conditions and methods of Example using the cellulose fiber-containing coating material and Comparative Example (cellulose fiber-noncontaining coating material). Conditions for drying and curing of the coats were that the temperature was 90° C. and the drying time was 10 minutes. The obtained weather strips were subjected to measurement of transmitted sound in a sound-insulating property test facility illustrated in FIG. 5. The sound pressure at the sound source was 90 dB, and the measurement frequency was in the range from 100 Hz to 10000 Hz. FIG. 6 shows a result of overall (OA) values in the band range from 1 kHz to 4 kHz.

FIG. 6 demonstrates that each of the cellulose fiber-containing coating material and the cellulose fiber-noncontaining coating material also shows a tendency in which as the specific gravity of the rubber sponge material decreases, the transmitted sound increases (sound-insulating property decreases). The cellulose fiber-containing coating material of Example, however, shows a higher sound-insulating property than in the cellulose fiber-noncontaining coating material at specific gravities of 0.7 or less, and as the specific gravity decreases, shows a higher sound-insulating effect than the cellulose fiber-noncontaining coating material. It should be noted that in the range where the specific gravity is 0.48 or less, the difference in transmitted sound OA value between Example (cellulose fiber-containing coating material) and Comparative Example (cellulose fiber-noncontaining coating material) tends to decrease as the specific gravity decreases. However, at a specific gravity of 0.36, the difference in transmitted sound OA value is 0.2 dB. FIG. 6 demonstrates that at a specific gravity of 0.3, Example still shows a higher sound-insulating effect than Comparative Example. In view of this, the specific gravity is preferably 0.3 or more and 0.7 or less.

Effect of Fiber Diameter of Cellulose Fibers

Weather strips having different diameters of cellulose fibers were prepared with conditions and methods of Example and Comparative Example using 2% cellulose fiber slurries having cellulose diameters of 10 nm, 100 nm, 1 μm, and 10 μm. Then, transmitted sound of these weather strips were evaluated in the facility illustrated in FIG. 5.

Consequently, it was observed that although there are variations to some degrees, substantially the same sound-insulating property can be obtained irrespective of different cellulose fiber diameters.

What is claimed is:
1. A sound-insulating sponge material, comprising:
a rubber sponge material made of an ethylene-propylene-diene rubber and having a specific gravity range of 0.45 to 0.57; and
a resin coat that coats a surface of the rubber sponge material, the resin coat containing:
silicone resin, and
cellulose fibers dispersed in the silicone resin, wherein:
the cellulose fibers are made from a broad-leaved tree bleached kraft pulp, and a content of the cellulose fibers in the resin coat is about 10% by mass, and
wherein the sound-insulating sponge material exhibits a sound insulating property such that a sound transmission across the sound-insulating sponge material is less than a same sound-insulating sponge material without the cellulose fibers dispersed in the resin coat.
2. The sound-insulating sponge material of claim 1, wherein the cellulose fibers have a specific surface area greater than or equal to 5 m²/g and less than or equal to 600 m²/g.
3. A vehicle sealing material comprising the sound-insulating sponge material of claim 1.
4. The vehicle sealing material of claim 3, wherein the vehicle sealing material is a weather strip.
5. The sound-insulating sponge material of claim 1, wherein the cellulose fibers have a mode at 5 μm or more in a pseudo particle size distribution curve based on the volume measured by laser diffraction.
6. A sound-insulating sponge material, comprising:

a rubber sponge material made of an ethylene-propylene-diene rubber and having a specific gravity of 0.45 or more and 0.57 or less; and a resin coat that coats a surface of the rubber sponge material, the resin coat containing:

silicone resin, and cellulose fibers dispersed in the silicone resin, wherein:

the cellulose fibers are made from a broad-leaved tree bleached kraft pulp, a content of the cellulose fibers in the resin coat is about 10% by mass, and the cellulose fibers are fibrillated to have a specific surface area greater than or equal to 5 $m^2/g$ and less than or equal to 600 $m^2/g$.

7. A vehicle sealing material comprising the sound-insulating sponge material of claim 6.

8. The vehicle sealing material of claim 7, wherein the vehicle sealing material is a weather strip.

9. The sound-insulating sponge material of claim 6, wherein the cellulose fibers have a mode at 5 μm or more in a pseudo particle size distribution curve based on the volume measured by laser diffraction.

\* \* \* \* \*